Figure 1:
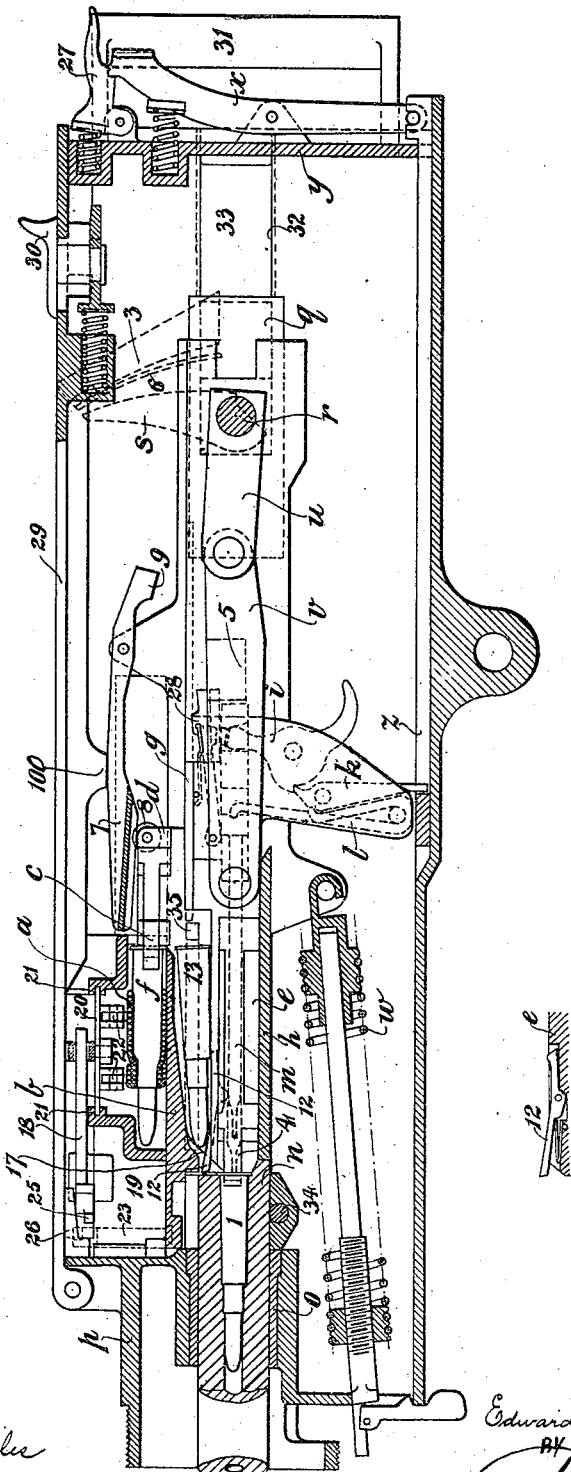

No. 671,062. Patented Apr. 2, 1901.
E. W. ANDERSON.
AUTOMATIC GUN.
(Application filed Feb. 24, 1900.)

(No Model.) 7 Sheets—Sheet 2.

WITNESSES:
INVENTOR
Edward William Anderson
BY
ATTORNEYS

No. 671,062. Patented Apr. 2, 1901.
E. W. ANDERSON.
AUTOMATIC GUN.
(Application filed Feb. 24, 1900.)
(No Model.) 7 Sheets—Sheet 3.

WITNESSES:

INVENTOR
Edward William Anderson
BY
ATTORNEYS

No. 671,062. Patented Apr. 2, 1901.
E. W. ANDERSON.
AUTOMATIC GUN.
(Application filed Feb. 24, 1900.)

(No Model.) 7 Sheets—Sheet 4.

WITNESSES:

INVENTOR
Edward W. Liam Anderson
BY
ATTORNEYS

No. 671,062. Patented Apr. 2, 1901.
E. W. ANDERSON.
AUTOMATIC GUN.
(Application filed Feb. 24, 1900.)
(No Model.) 7 Sheets—Sheet 5.

WITNESSES:

INVENTOR
Edward William Anderson
BY
ATTORNEYS

No. 671,062. Patented Apr. 2, 1901.
E. W. ANDERSON.
AUTOMATIC GUN.
(Application filed Feb. 24, 1900.)
(No Model.) 7 Sheets—Sheet 6.
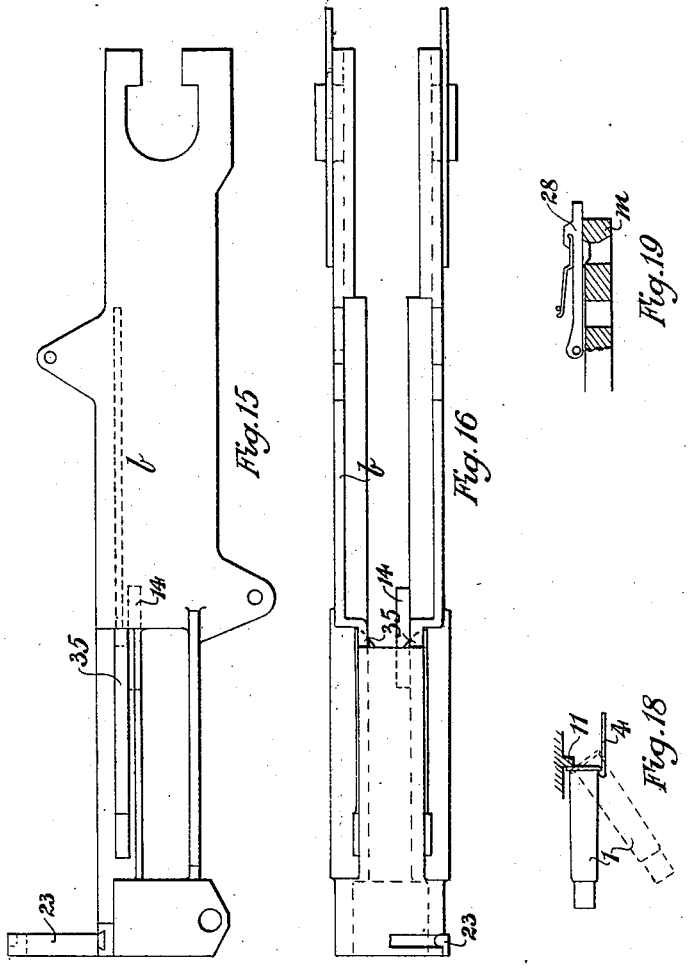

No. 671,062. Patented Apr. 2, 1901.
E. W. ANDERSON.
AUTOMATIC GUN.
(Application filed Feb. 24, 1900.)

(No Model.) 7 Sheets—Sheet 7.

WITNESSES:
INVENTOR
Edward William Anderson
BY
ATTORNEYS

UNITED STATES PATENT OFFICE.

EDWARD WILLIAM ANDERSON, OF WITTON, ENGLAND.

AUTOMATIC GUN.

SPECIFICATION forming part of Letters Patent No. 671,062, dated April 2, 1901.

Application filed February 24, 1900. Serial No. 6,328. (No model.)

*To all whom it may concern:*

Be it known that I, EDWARD WILLIAM ANDERSON, a subject of the Queen of Great Britain and Ireland, residing at Lion Works, Witton, in the county of Warwick, England, have invented certain new and useful Improvements in Automatic Guns, (for which I have made application for Letters Patent in Great Britain, No. 15,312, dated July 25, 1899,) of which the following is a specification.

The object of this invention is, first, to provide an automatic or machine gun of few and simple parts of the type in which the projectiles are discharged in rapid sequence from a single barrel, the operations of loading, firing, and ejecting being performed, preferably, by suitable mechanisms acquiring motion through the agency of the energy of recoil of the barrel and adjacent parts.

The second object of the invention is to provide a machine or automatic gun the mechanism of which may be quickly removed without the aid of special tools for inspection or cleaning.

In carrying the invention into effect I provide a rifled barrel of suitable weight to give the desired velocity and energy of recoil and mounted to slide in an axial direction through bushes or guides carried upon the main frame of the gun. The barrel is water-jacketed or provided with radiator-collars to prevent overheating. To the rear or breech end of the barrel I attach securely a receiver or frame, which carries on suitable guides the bolt and firing mechanism, consisting of tumbler, striker, mainspring, and sear. The bolt is arranged to slide within the receiver in the direction of the axis of the barrel. The rear end of the receiver carries an axle or pin, which is provided with a crank and two cam-levers which engage fixed cams on the body of the gun to operate the bolt. The cartridges to be fired are inserted in a bandoleer or belt, and such belt is then fed into the gun through an opening. The bandoleer is fed forward as the cartridges are automatically withdrawn therefrom by a lever operated by the reciprocation of the receiver. Spring-clips mounted upon the bolt clip the base of each cartridge in turn, and on the backward movement of the bolt the cartridge is withdrawn from the bandoleer. On the completion of the backward stroke of the bolt a lever carried on the receiver pushes the cartridge vertically downward into a pocket formed by the bolt and frame in a position above the axis of the barrel. At the next forward stroke of the bolt the cartridge is pushed into and carried upon the receiver by a projection and there remains to be pushed into the breech of the barrel by a suitably-arranged spring-pawl on the next forward stroke of the bolt. At each backward movement of the bolt an extractor withdraws the fired cartridge-shell from the breech and ejects it through an opening formed in the main frame. A spring attached to the receiver serves to return it to its forward position after each recoil. To fire the gun, a lever is pressed, which causes the sear to be withdrawn from the bent in the tumbler, and on the backward stroke of the bolt a link connecting the bolt to the crank above described serves to recock the tumbler, and on the completion of the next forward stroke of the bolt the sear is again operated automatically, the whole of the operations of loading, firing, and extracting continuing so long as the lever is depressed. Safety-catches are provided to prevent accidental firing, and provision is also made for operating the mechanism by hand. In order that the mechanism may be easily examined or taken apart, I provide the main frame or case with a hinged lid or cover secured in its closed position by a spring-catch. The rear end of the main frame or case is arranged to slide vertically in guides formed in the sides of the main frame and is secured in position by the locking of the catch which secures the hinged cover. The cartridge-feed mechanism is arranged on a frame, which may be removed on opening the hinged cover. To allow of the removal of the receiver and bolt, slots are provided in the main case, extending in a backward direction and covered by sliding doors or shutters, which may be withdrawn after removing the rear end of the main case. By this means the whole mechanism is secured in position by one spring-catch, which, however, is not in any way strained by the operation of firing the gun.

The accompanying drawings illustrate a gun constructed according to one modification of my invention.

Figure 2:
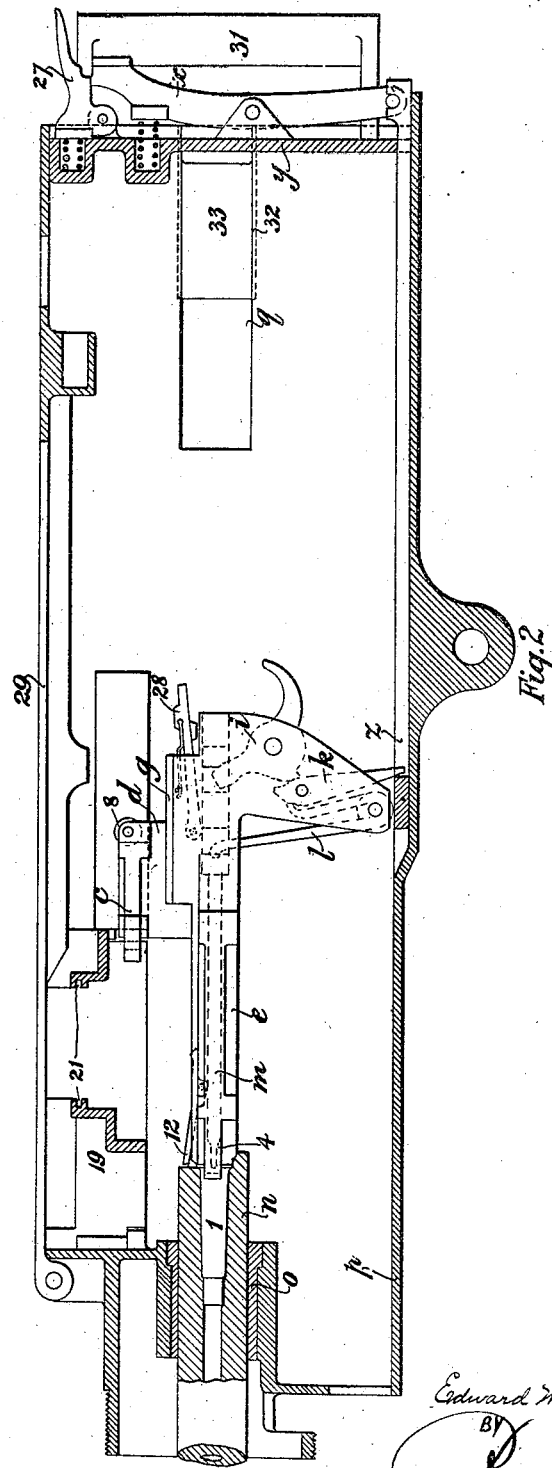
Figure 3:
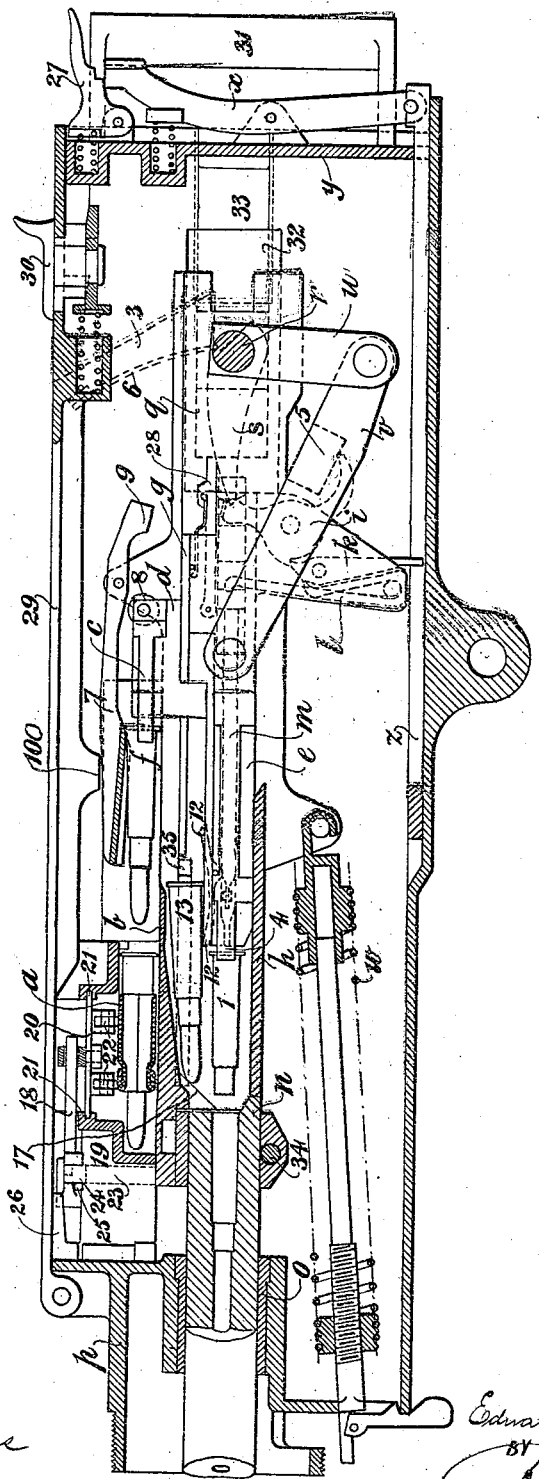
Figure 4:
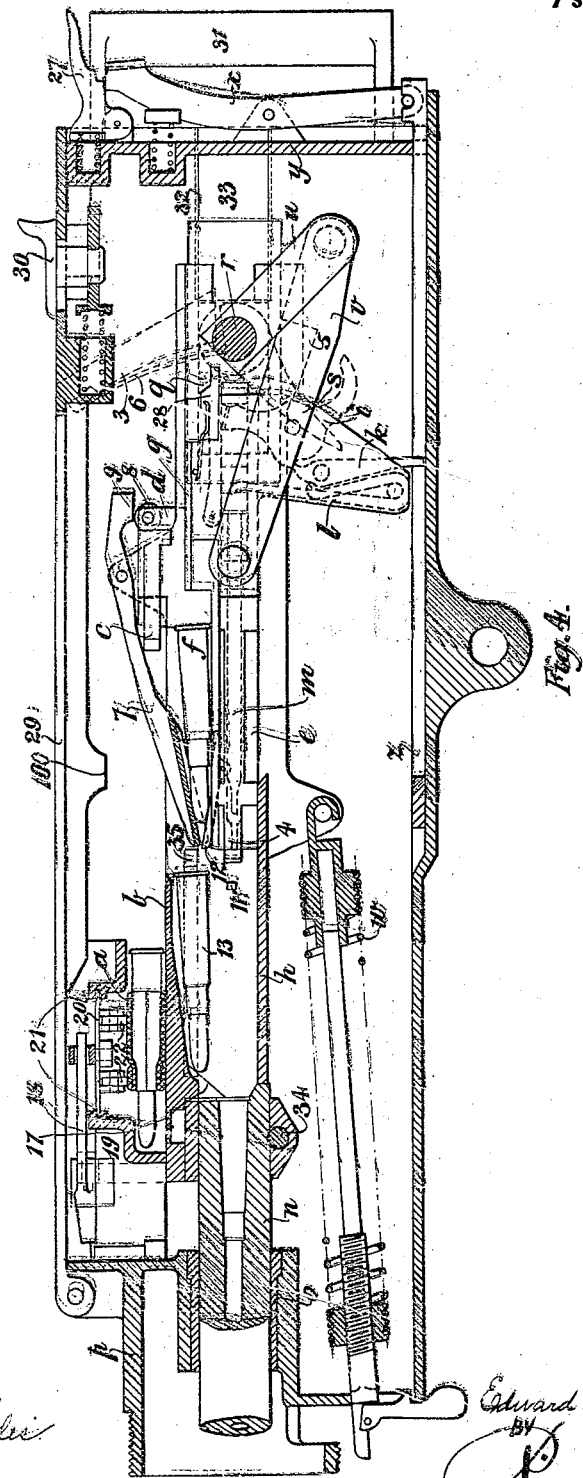
Figure 5:
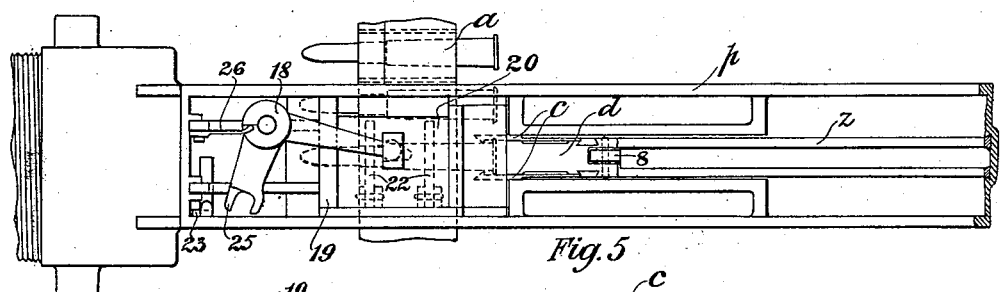
Figure 6:
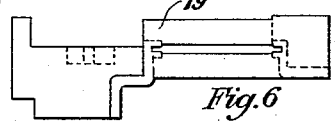
Figure 11:
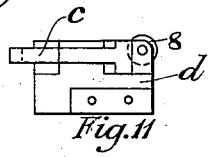
Figure 7:
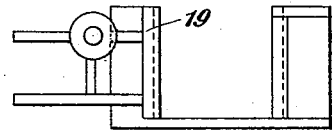
Figure 12:
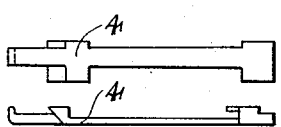
Figures 8, 9:
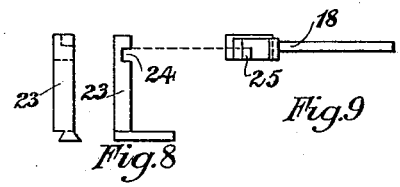
Figure 10:
Figure 13:
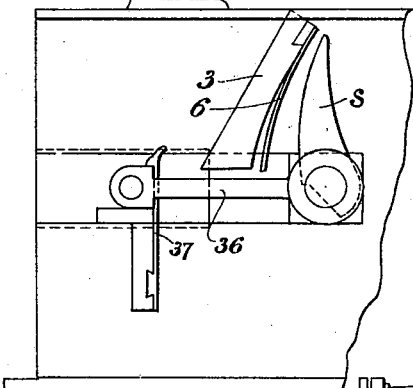
Figure 10A:
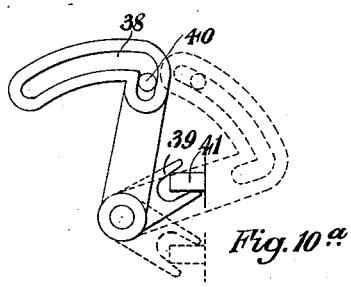
Figure 14:
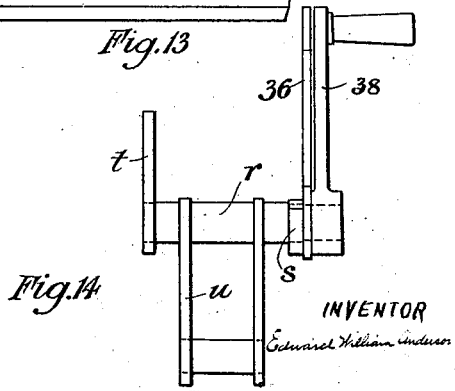
Figure 17:
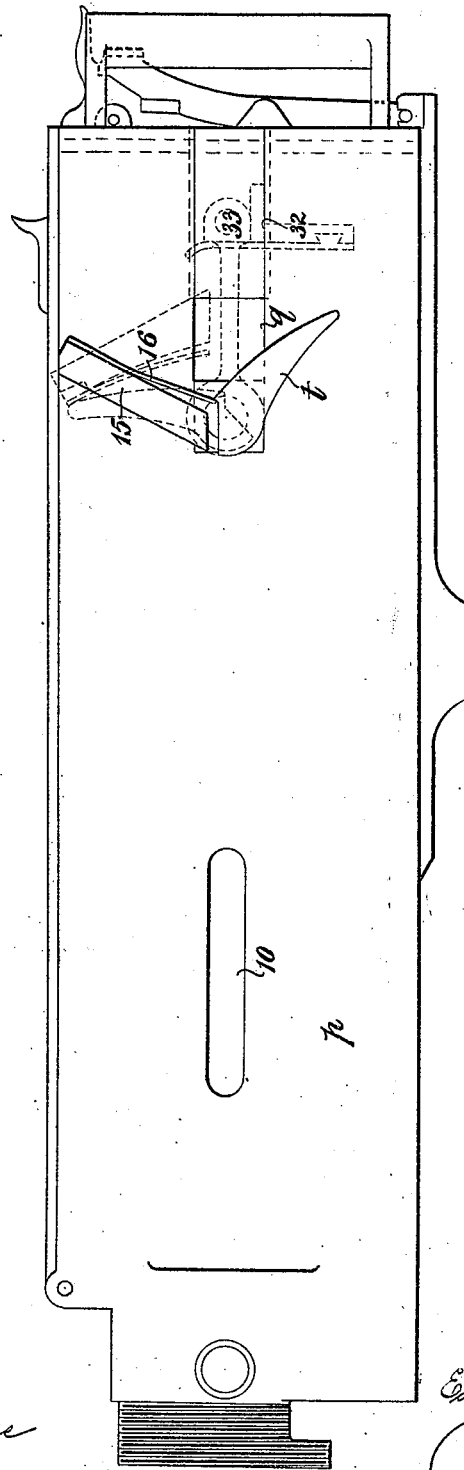

Figure 1 is an elevation in section on the center line of the main case and inclosed mechanism for automatic firing, the parts being shown in the position ready to commence firing. Fig. 1ᵃ is a detail view of the spring-pawl. Fig. 2 is a similar section to Fig. 1, but with parts of the mechanism removed for clearness and the remaining parts shown in the position assumed immediately after firing. Fig. 3 shows the mechanism in the position when the recoil of the barrel and receiver has progressed, but is not complete. Fig. 4 shows the mechanism when the recoil is complete and the bolt fully back ready for the return stroke. Fig. 5 is a plan of the main case with the cover removed and showing the cartridge-feed mechanism. Figs. 6 and 7 are an elevation and plan of the removable guide of the cartridge-feed mechanism. Figs. 8, 9, and 10 are details of the cartridge-feed mechanism. Fig. 10ᵃ shows an alternative feed mechanism. Fig. 11 is a detail view of the spring-clips carried upon the bolt and arranged to withdraw the cartridges from the bandoleer. Fig. 12 shows the extractor for withdrawing the spent cases from the breech of the barrel. Fig. 13 shows the cam-lever and parts for withdrawing the bolt. Fig. 14 shows the axle carried by the receiver. Figs. 15 and 16 show detail views of the receiver. Fig. 17 is an elevation of the main frame or case. Fig. 18 shows the method of ejecting the spent case. Fig. 19 shows the safety-catch which engages the firing-pin.

For the purpose of description I will assume the mechanism to be in the position for firing to commence on the depression of the firing-lever and that the cartridges are already in position in the gun. This position of the mechanism is shown in Fig. 1. The cartridges are held in a bandoleer $a$ and are fed into the gun above the receiver $b$. Clips $c$, mounted upon the block $d$, (shown in detail in Fig. 11,) carried upon the bolt $e$, engage the base of the cartridge $f$. The bolt $e$ is carried in the receiver $b$ and is guided by ribs, as $g$, and surfaces, as $h$. The bolt $e$ carries a tumbler $i$, sear $k$, mainspring $l$, and striker-pin $m$. The receiver $b$ is securely attached to the barrel $n$, which slides axially through bushes or guides, as $o$, carried by the main case $p$. The rear end of the receiver $b$ is guided in slots, as $q$, and carries the axle $r$. The axle $r$, Fig. 14, carries two cam-levers $s$ $t$ and crank-arms $u$, having a connecting rod or link $v$, attached to the bolt $e$. A spring $w$ serves to keep the receiver $b$ and barrel $n$ in a forward position. A lever $x$, carried upon the end $y$ of the main frame $p$, when depressed operates the sliding rod $z$, thus pulling the sear $k$ out of the bent and allowing the tumbler $i$ to fall and the striker-pin $m$ to be driven forward by the spring $l$ to fire the cartridge 1 within the breech of the barrel $n$.

The position of the mechanism at the instant of firing is shown in Fig. 2. For the sake of clearness the receiver and cartridge-feed mechanism are omitted in this figure. At the instant of movement of the bullet within the barrel on firing recoil commences. The barrel $n$, together with the receiver $b$ and bolt $e$, moves bodily backward in the main case $p$, being guided in the supports $o$ $q$. The cartridge 13 is prevented from being carried backward with the bolt $e$ by the spring-clips 35. During this movement several operations are performed. After a slight movement the clips $c$ engage the head of the cartridge $f$ and withdraw it from the bandoleer $a$. At the same time the cam-lever $s$, carried on the axle $r$, comes into contact with the fixed stop 3, Fig. 1, on the main frame $p$, thus causing rotation of the axle $r$. Owing to the shape of the cam-lever $s$ and fixed stop 3 the rotation of the axle $r$ is fairly rapid, and through the agency of the crank-arm $u$ and link $v$ the bolt $e$ is withdrawn from contact with the breech of the barrel $n$ and slides within the receiver $b$. The extractor 4, Fig. 12, carried on the bolt $e$, thus engages the rim of the spent case 1 and extracts it from the breech, as shown in Fig. 3. The extractor 4 is so arranged that when the bolt is in contact with the breech of the barrel the extractor-hook is clear of the rim of the cartridge 1, so as to allow the bolt to acquire momentum before extraction commences. The revolution of the axle $r$, and consequent depression of the link $v$, causes the projection 5 to engage the toe of the tumbler $i$ and recock the firing mechanism, as shown in Fig. 3. As shown in Fig. 3, the receiver $b$ and barrel $n$ are almost fully recoiled, while the bolt $e$ is withdrawn about two-thirds of its full stroke in the receiver $b$. The completion of the stroke of the bolt $e$ is performed by the spring 6 on the fixed stop 3. When the recoil of the receiver $b$ and stroke of the bolt $e$ are complete, the mechanism is in the position shown in Fig. 4. In passing from the position shown in Fig. 3 to that shown in Fig. 4 two important changes have occurred. The cartridge $f$ has been forced downward by the lever 7, carried on the receiver $b$, and rests on top of the bolt $e$, its base being in contact with the block $d$. The lever 7 is operated by the roller 8, carried on the block $d$, striking its rear cam-like end 9. The spent case 1 has been ejected through the opening 10 formed in the main frame $p$, Fig. 17, the ejection being performed by the fixed stop 11 engaging the base of the cartridge while the extractor 4 continues to move backward, thus giving to the case a rotary motion, as indicated by Fig. 18. During the backward stroke of the bolt $e$ the spring-pawl 12 has passed under the cartridge 13, carried in the receiver $b$, by the projection 14, Figs. 15 and 16, and, as shown in Fig. 4, has risen up behind the cartridge 13. The pressure of the cartridge $f$ on the tail of the spring-pawl 12 assists this movement. The mechanism is now ready to be returned to the position shown in Fig. 1 by the tension of the spring $w$. On the forward movement of the receiver $b$ and barrel $n$ the cam-lever $t$, Fig. 17, strikes the fixed stop 15 on the main frame $p$ and causes rotation of the axle $r$ to return the bolt $e$ in a forward direction. On the forward movement of the bolt $e$ in the receiver $b$ the spring-pawl 12 engages the base of the cartridge 13, causing it to pass downward and enter the breech of the barrel $n$ by reason of the nose of the bullet sliding down the incline 17, formed within the receiver $b$. The rim of the cartridge 13 falls behind the hook of the extractor 4. The cartridge $f$ occupies the position recently vacated by the cartridge 13. At the same time the lever 7 is raised by the forward movement of the block $d$, carried upon the bolt $e$, and the spring-clips $c$ engage the base of the next cartridge in the bandoleer $a$ which has been fed forward in a manner to be described. A stop 100 prevents the lever rising too high. The forward motion of the receiver $b$ and bolt $e$ being complete, the mechanism is in the position shown in Fig. 1, and if the firing-lever $x$ is still depressed the sear $k$ will come into contact with the sliding rod $z$ and the operations of firing, extraction, recocking, ejection, and reloading will be continued. The mechanism is so arranged that the crank-pin on the crank-arm $u$ is slightly above the center line, and by this means the bolt $e$ is prevented from blowing open at the instant of firing.

The cartridge-feed mechanism is shown in plan at Fig. 5 and consists of a bell-crank lever 18, attached to the guide 19, Figs. 6 and 7. One end of the lever 18 operates the slide 20, Fig. 10, causing it to reciprocate in grooves 21, formed within the guide 19. The slide 20 is provided with pawls 22, which serve to feed the bandoleer $a$ forward at each stroke of the slide 20. The lever 18 is operated by a projection 23, carried upon the receiver $b$ at each forward stroke of the receiver. The bandoleer $a$, carrying the cartridges, is fed one place forward to bring the next cartridge into line with the clips $c$ during the early part of the forward stroke of the receiver $b$ and remains stationary during the latter part of the stroke when the clips $c$ engage the cartridge. This is provided for by the shape of the end of the lever 18, which engages the projection 23. The projection 23 is provided with a notch 24 to pass the projection 25 on the lever 18 at the required time. The action is as follows: Assuming the mechanism in the position as shown in Fig. 5, on the recoil stroke of the receiver $b$ the projection 23 is carried along and strikes the lever 18, causing it to swing around and move the slide 20, the pawls 22 passing over the next cartridge in the bandoleer $a$ and falling into the depression between two cartridges. A pawl prevents the bandoleer being carried backward at these stages.
On the return stroke of the receiver $b$ the projection 23 engages the projection 25, causing the arm 18 to swing around and carry the slide 20 forward, the pawls 22 feeding the bandoleer $a$ forward. After a certain movement the projection 25 will swing out of the path of the projection 23, thus allowing the projection 23 to continue its motion, the projection 25 passing through the slot 24. A spring 26 is provided to keep the lever 18 in its extreme position.

In place of the lever 18 and projection 23 I also employ the modified lever shown in Fig. 10$^a$, having a suitably-shaped slot 38 engaging a stud 40 upon the slide 20. The end 39 of the lever is always in contact with a projection 41 on the receiver and has motion at all times with the receiver. Owing to the shape of the slot 38 the slide 20 is operated while the stud 40 is in the radial portion, and when the receiver has moved the necessary distance the stud 40 passes into the circumferential part of the slot 38, and the slide 20 is consequently stationary.

Safety-catches are provided to prevent accidental discharge of the gun. To prevent the depression of the lever $x$, a spring-catch 27 is provided, which engages the end of the lever $x$, as shown in Fig. 1, so that before the lever $x$ can be depressed the spring-catch 27 must be raised. On the release of the lever $x$ the spring-catch resumes its position, as shown in Fig. 1. A safety-catch 28, Fig. 19, is also provided on the bolt $e$ to prevent premature discharge of the firing mechanism. As shown in Fig. 4, the spring-catch 28 engages the striker-pin $m$ and prevents the said striker-pin being operated by the spring 1 before the mechanism is in the position shown in Fig. 1. On the mechanism passing from the position shown in Fig. 4 to that shown in Fig. 1 the projection 5 on the link $v$ raises the spring-catch 28 out of engagement with the striker-pin $m$.

To prevent rotation of the axle $r$ when the gun is in position shown in Fig. 1, I provide a lever-arm 36 upon the axle $r$ and a spring-catch 37 engaging therewith. The backward movement of the axle $r$ when moved by the receiver frees the lever 36 from the spring-catch 37 and leaves the axle $r$ free to revolve. A handle 38 may be fixed to the lever 36 for operating the mechanism by hand to get the cartridges into the required positions, as shown in Fig. 1. In this case the spring-catch 37 is depressed and the handle 38 operated to work the bolt $e$ backward and forward. By this means the cartridges are fed from the bandoleer through the gun without the risk of being fired so long as the lever $x$ is not depressed. The cartridges are caused to occupy the positions shown in Fig. 1, and automatic firing may be then brought about by depressing the lever $x$.

In order that the mechanism may be easily examined or taken apart I, provide the main frame or case $p$ with a hinged lid or cover 29, secured in its closed position by a spring-catch 30. The rear end $y$ of the main frame or case is arranged to slide vertically in guides formed in the sides of the main frames and is secured in position by the hinged cover when in its closed position. The rear end $y$ carries the firing-lever $x$ and spring-catch 27 and also handles, as 31. The cartridge-feed mechanism is arranged on a frame 19, which is guided by grooves in the main frame $p$ and may be removed when the hinged cover 29 is open. To allow of the removal of the receiver $b$ and bolt $e$, slots 32 are provided in the main frame, extending in a backward direction and covered by sliding doors or shutters 33, which may be withdrawn after removing the rear end $y$ of the main frame. By this means the whole mechanism is secured in position by one spring-catch, which, however, is not in any way strained by the operation of firing. The receiver $b$ may be separated from the barrel $n$ by slacking the bolt 34.

The method of introducing cartridges in stages hereinbefore described may also be applied to automatic guns or machine-guns operated without recoil.

Having thus described my invention, what I claim as new, and desire to secure by Letters Patent, is—

1. In combination, in an automatic gun, the barrel, a bolt, means for reciprocating said bolt, means for engaging and withdrawing the cartridge by the backward movement of the bolt, a pressing device operated by the bolt for forcing the cartridge to an intermediate level, means whereby upon the forward movement of the bolt the cartridge is located in the same or nearly the same plane as left by the pressing device and clear of the extracted cartridge, and means for forcing the cartridge from its intermediate position into the chamber of the barrel by the next forward movement of the bolt, substantially as described.

2. In an automatic gun, in combination with a receiver and barrel arranged to recoil on firing the gun and a bolt sliding within the receiver, and withdrawn by the action of an axle having crank-arms and a cam-lever engaging a fixed stop, a second cam-lever on said axle, and second fixed stop for returning the bolt on the forward stroke of the receiver, the said axle moving with the receiver, substantially as described.

3. In an automatic gun and in combination, a receiver, a sliding bolt carried thereby, an axle also carried by the receiver, and connected with the bolt, cam-levers on the axle, fixed stops on the casing, an operating lever-arm and a spring-retaining catch therefor, substantially as described.

4. In an automatic gun, in combination with a receiver and bolt, a cartridge-supporting ledge or ledges within the receiver, a cartridge-directing incline, and a cartridge-injecting spring-pawl carried on the bolt, substantially as described.

5. In an automatic gun, in combination with cartridge-feeding mechanism comprising a slide, a lever having a slot, partly radial, and partly circumferential and connected to the said slide; an arm attached to the pivoting axis of said lever, and an actuating projection upon the receiver, substantially as described.

In witness whereof I have hereunto set my hand in presence of two witnesses.

EDWARD WILLIAM ANDERSON.

Witnesses:
 EDWARD MORRIS,
 FRED. E. PALMER.